US007898681B2

(12) United States Patent
Machida (10) Patent No.: US 7,898,681 B2
(45) Date of Patent: Mar. 1, 2011

(54) COOPERATIVE PROCESSING METHOD, COOPERATIVE PROCESSING APPARATUS, AND STORAGE MEDIUM STORING PROGRAM FOR COOPERATING PROCESSING

(75) Inventor: Masahiro Machida, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1222 days.

(21) Appl. No.: 11/319,528

(22) Filed: Dec. 29, 2005

(65) Prior Publication Data

US 2007/0046974 A1 Mar. 1, 2007

(30) Foreign Application Priority Data

Aug. 24, 2005 (JP) .............................. 2005-242022

(51) Int. Cl.
*G06K 15/00* (2006.01)
*G06F 3/12* (2006.01)
*H04N 1/00* (2006.01)

(52) U.S. Cl. .................... 358/1.15; 358/1.14; 358/1.16; 358/407

(58) Field of Classification Search ....... 358/1.13–1.18, 358/1.9, 402, 403, 407, 408, 425
See application file for complete search history.

(56) References Cited

U.S. PATENT DOCUMENTS

| 2003/0107761 A1* | 6/2003 | Kimura ..................... 358/1.15 |
| 2003/0174359 A1* | 9/2003 | Gomi ........................ 358/1.15 |

FOREIGN PATENT DOCUMENTS

| JP | A 10-42121 | 2/1998 |
| JP | A 2001-290629 | 10/2001 |
| JP | A 2003-271357 | 9/2003 |
| JP | A 2004-058491 | 2/2004 |

OTHER PUBLICATIONS

Mar. 18, 2010 Office Action issued in Japanese patent application No. 2005-242022 (with partial translation).

* cited by examiner

*Primary Examiner*—James A Thompson
(74) *Attorney, Agent, or Firm*—Oliff & Berridge, PLC (57) ABSTRACT

A cooperative processing method for a cooperative processing system which has a plurality of processing apparatuses includes:
detecting an error of a process of a cooperative process in an apparatus of the cooperative processing system; and
deleting data which relate to the cooperative process from the apparatus or other apparatus which relates to the cooperative process.

9 Claims, 4 Drawing Sheets

COOPERATIVE PROCESSING METHOD, COOPERATIVE PROCESSING APPARATUS, AND STORAGE MEDIUM STORING PROGRAM FOR COOPERATING PROCESSING

This application claims priority under 35 USC 119 from Japanese patent document, 2005-242022, the disclosure of which is incorporated by reference herein.

BACKGROUND OF THE INVENTION (1) Field of the Invention

The present invention relates to a cooperative processing method, a cooperative processing apparatus, an external cooperative system, and a storage medium storing a program for realizing them, in which an image forming apparatus, such as, a printer, a facsimile apparatus or a multifunction machine having those functions, cooperates with an external apparatus to perform a specified process which can not be handled by the image forming apparatus, so that a specified process which can not be realized by only one of the apparatuses is realized. More particularly, the invention relates to a contrivance of handling in a case where an error occurs in any one of apparatuses at the time of a cooperative process.

(2) Description of the Related Art

There is an external cooperative system in which plural apparatuses (devices) cooperate with each other to perform a specified process, so that various processes which can not be provided by only one of the apparatuses are performed.

For example, a system is known in which in a case where image information read by one image forming apparatus is temporarily stored in another image forming apparatus, when the image information becomes unnecessary for the image forming apparatus as a request source, the image forming apparatus as a request destination is notified, to avoid that the useless memory remains in the request destination.

However, according to the system described above, in order to avoid the unnecessary image residue in the image forming system in which plural image forming apparatuses such as digital copying machines are provided and the image forming apparatuses are connected to each other through a communication apparatus, they are constructed to communicate with each other. Thus, there is still a problem in a case where an image forming apparatus (corresponding to a main image forming apparatus disclosed in patent document 1) is connected to an external equipment (except a sub-image forming apparatus disclosed in patent document 1) on other network, not the other cooperative image forming apparatus, or in a handling method of a case where data to be communicated with each other is other than image data.

For example, after scan data is transferred from a device to a cooperative application service provider (ASP; Application Service Provider) and a character recognition (OCR; Optical Character Reader) process or the like is performed, when an error occurs during the process, there is a possibility that an intermediate product or data remains in the device or the ASP, and there arises a problem that the data is accumulated to occupy the memory and becomes a processing load, and further, there arises a problem of security of the remaining data.

SUMMARY OF THE INVENTION

According to an aspect of the invention, a cooperative processing method for a cooperative processing system which has a plurality of processing apparatuses includes: detecting an error of a process of a cooperative process in an apparatus of the cooperative processing system; and deleting data which relate to the cooperative process from the apparatus or other apparatus which relates to the cooperative process.

BRIEF DESCRIPTION OF THE DRAWINGS

Embodiments of the invention will be described in detail based on the following figures, wherein.

DETAILED DESCRIPTION OF THE INVENTION

Hereinafter, embodiments of the invention will be described in detail with reference to the drawings.

<System Structure>

Figure 1:
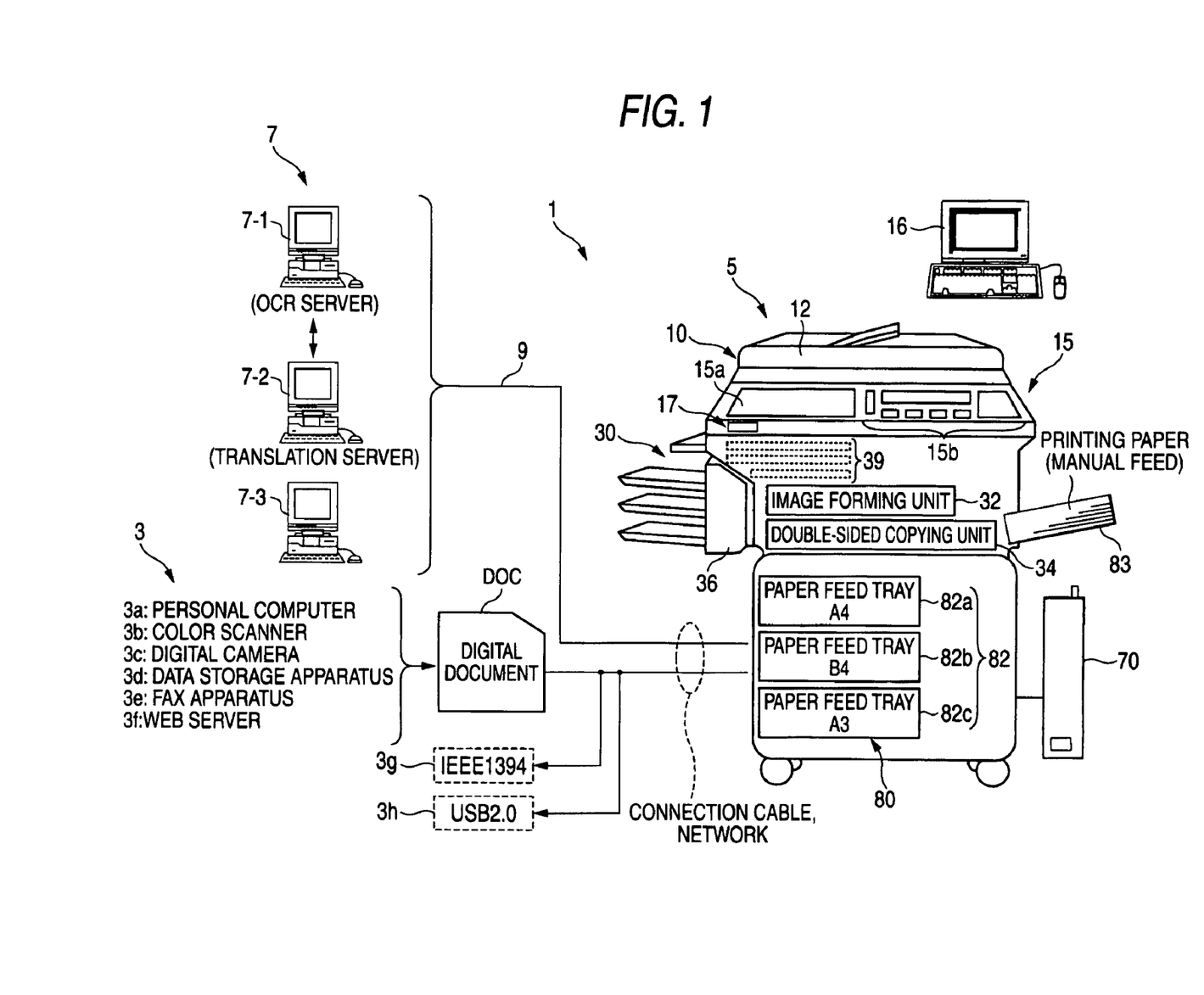
FIG. 1 is a view showing a structural example of an external cooperative system according to the invention in which an image forming apparatus and an external apparatus are network-connected to each other.

FIG. 1 is a view showing a structural example of an external cooperative system in which an image forming apparatus and an external apparatus, which are examples of a cooperative processing apparatus of the invention, are network-connected to each other.

The external cooperative system 1 is constructed such that an image forming apparatus 5 which reads an image, performs a print process based on the read image, and performs a print process based on print data received from a client terminal is connected through a network 9 to an external apparatus 7 which performs a specified data process incapable of being handled by the image forming apparatus 5. Incidentally, as the external apparatus 7, three kinds of external apparatuses 7-1, 7-2 and 7-3 are prepared in this example.

The image forming apparatus 5 can start a specified cooperative process job by a user operation from a user interface equipment provided in a main body and by a start instruction from the external apparatus 7 on the network.

In the external cooperative system 1 having the structure as stated above, the one apparatus performs at least a partial process of the cooperative process, and the other apparatus performs the remaining process of the cooperative process, so that various processes which can not be provided by only one of the apparatuses can be performed in cooperation with each other.

An image input terminal 3 is connected with the image forming apparatus 5 and data of a process object is inputted thereto. For example, the image input terminal 3 can include an arbitrary number of image input sources which create a digital document (hereinafter simply referred to as a document) DOC and perform processes such as editing, for example, a personal computer 3a, a color scanner 3b, a digital camera 3c, a data storage apparatus 3d such as a hard disc apparatus, a magneto-optical disc apparatus or an optical disc apparatus, a FAX apparatus 3e, and the like. Besides, a Web server 3f on the Internet can be an image input source which inputs a digital document such as a homepage to the image forming apparatus 5.

An application program for document DOC creation and the like are incorporated in each of the image input terminals 3. For example, electric data to express a document DOC prepared at the image input terminal 3 side is described in an image format (for example, JPEG, BMP, PNG, etc.) which can be handled by the image forming apparatus 5.

Besides, for example, a document file created by the personal computer 3a is sent to the image forming apparatus 5, for printout by a printer or the like, as data described in a page description language (PDL: Page Description Language) which can freely control the enlargement, rotation, deformation and the like of figures, characters and the like. The image forming apparatus 5 having received the PDL data renders (rendering extension) the image data in each output unit before printing, and then outputs raster data to the image output part (printer engine part).

The image forming apparatus 5 is a so-called compound machine (multi-function machine) having, for example, a copying function, a page printer function and a facsimile transmission/reception function, and is constructed as a digital print apparatus.

The image forming apparatus 5 roughly includes an image readout part 10 to read a document, a controller part 20 having an image processing function to apply a desired image process to the inputted image data and a control function to control the operation of the whole terminal, an image output part 30 to form a visible image on a specified output medium based on the image data from the controller part 20 and to output it, and a paper feed part 80 to transport a printing paper as the output medium to the image output part 30 from one of built-in paper feed trays 82 (three-stage structure of 82a, 82b and 82c in the drawing) and a manual feed tray 83. Incidentally, the output medium is not limited to the paper, but may be any medium as long as it can print-output information, and includes, for example, an OHP film.

The controller part 20 is provided on a processing board 39 disposed in a boundary portion between the image readout part 10 and the image output part 30. Incidentally, the respective paper feed trays 82 may not be detachable/attachable from/to an apparatus main body in a normal use (for example, except the time of maintenance), or may be detachable/attachable.

The image forming apparatus 5 is connected to an accounting apparatus 70. The accounting apparatus 70 performs not only an accounting process, such as a price calculation or adjustment process, to a process of only the image forming apparatus 5, such as a copying or printing, but also an accounting process, such as a price calculation or adjustment process, to a cooperative process using the external cooperative system 1.

The image forming apparatus 5 can be connected to the image input terminal 3 or the external apparatus 7 through a connection cable or a network. It is connected to the image input terminal 3 such as the personal computer by, for example, a CSMA/CD (Carrier Sense Multiple Access with Collision Detection) type LAN (Local Area Network; for example, IEEE802.3) or a gigabit (Giga Bit) base LAN (hereinafter collectively referred to as a wired LAN). Incidentally, the wired LAN may be made a wireless LAN.

Alternatively, the image forming apparatus is connected to the image input terminal 3 such as the FAX apparatus through a public switched telephone network (PSTN). Incidentally, instead of the public switched telephone network (PSTN) 9, ISDN (Integrated Switched Digital Network) or another communication medium including the Internet may be used to exchange facsimile data.

Besides, the image forming apparatus 5 can be connected with, for example, a device 3g based on IEEE (Institute of Electrical and Electronics Engineers, Inc.) 1394 standard, or a device 3h based on USB (Universal Serial Bus) 2.0 standard, and can also receive digital image data from these devices 3g and 3h. Alternatively, the image forming apparatus 5 can be controlled remotely through these devices 3g and 3h.

By such structure, as described above, the image forming apparatus 5 has not only a print function of an image read by the image readout part 10, that is, a copy function, but also a so-called print function to print an image based on document data or image files acquired from the image input terminal 3, such as the personal computer, through a connection cable 90, and a function to make print-output based on FAX data and other image data acquired through the telephone line or the other communication interface.

The image readout apparatus 10 has also a function of a platen cover, and includes a document feeder (ADF (Auto Document Feeder) device) 12 which transports a document to a readout position on a not-shown readout stand (platen glass) and ejects it and has no circulation function, and a user interface part 15 which has an operation panel part 15a to display guidance information for use of the apparatus, specified information processing results, management information and the like, and an operation key part 15b to receive various instruction inputs to the apparatus from an operator. Incidentally, instead of the operation panel part 15a or the operation key part 15b, or together with these, a user interface apparatus 16 including a large user interface or a maintenance screen may be provided. Besides, an ID card insertion port 17 for user authentication is provided at the lower part of the operation panel part 15a and at the front side of the apparatus.

The image readout part 10 has a function of an image input terminal, and uses, for example, a full array of CCD solid image pickup elements, irradiates light to a document sent to the readout position to read an image on the document, converts an analog video signal of red, green and blue to indicate the read image into a digital signal, and sends it to an image processing function part of the controller part 20.

When the readout is completed in this way, the image processing function part of the controller part 20 obtains on-off digitized toner signals of black (K), yellow (Y), magenta (M) and cyan (C) based on image data R, G and B of red, green and blue from the image readout part 10, and outputs the respective toner signals to the image output part 30.

The image output part 30 includes an image forming unit 32, a double-sided copying unit 34, a paper output unit 36 including plural paper output trays 36 from which the normal transfer paper (recorded paper) is ejected, and one or plural (plural pieces are shown in the drawing) processing boards 39.

The image forming unit 32 forms (prints), that is, copies a visible image on a normal paper or thermal paper by using an electrophotographic, thermal, thermal transfer, ink-jet or similar conventional image forming process from an image expressed by an image signal obtained by the image readout apparatus 10. Thus, the image forming unit 32 includes a print engine of a raster output scan (ROS) base to operate the image forming apparatus 5 as a digital print system.

Not only a processing part (especially an image processing part and a controller) for the image output part 30, but also an image processing function part of the controller part 20 and a circuit for performing various processes of the whole image forming apparatus 5 are mounted on the processing board 39.

For example, the circuit is mounted which controls the document feeder 12, the operation panel part 15*a*, a not-shown image readout unit (scanner part) of the image readout part 10, the image forming unit 32, the double-sided copying unit 34, the paper output unit 36, the paper feed tray 82 or the like, which is the resource configured in the image forming apparatus 5. A semiconductor storage medium is mounted on the processing board 39, and a processing program for, for example, a copy application, a printer application, a facsimile (FAX) application, or another application is stored.

For example, the image readout apparatus 10 has the function of the image input terminal, and uses, for example, a full array of CCD solid image pickup elements, irradiates light to a document sent to the readout position to read an image on the document, converts an analog video signal to indicate the read image into a digital signal, and sends it to the image processing function part of the controller part 20.

When a paper is fed to the image output part 30 from one of the plural (A4, B4, A3) paper feed trays 82 in synchronization with the readout of the image forming apparatus 10, the image forming unit 32 of the image output part 30 forms a visible image on one surface of the paper based on the toner signal of K, Y, M and C sent from the image processing function part of the controller part 20.

The double-sided copy unit 34 reverses the paper on the one surface of which the image is formed, and again feeds the paper to the image forming unit 32. By this, the image read by the image readout apparatus 10 is formed on the other surface, and the double-sided copy is completed.

The paper ejected from the image forming unit 32 or the double-sided copied paper is sorted by the paper output unit 36 sequentially in the order of pages or in a unit of one page.

The external apparatus 7 has a server function to perform a specified data process which can not be handled by the image forming apparatus 5. As examples, there are provided, as a first external apparatus 7, a first ASP 7-1 of performing a character recognition (OCR) based on image data sent from the image forming apparatus 5, as a second external apparatus 7, a second ASP 7-2 of performing a translation process based on document data sent from the image forming apparatus 5 and document data character-recognized by the first ASP 7-1, and as a third external apparatus 7, an accounting server 7-3 of performing an accounting process, such as a price calculation or adjustment process, to a cooperative process using the external cooperative system 1.

When an ID card is inserted into the ID card insertion port 17 or a user ID is inputted by the operation key part 15*b*, the image forming apparatus 5 verifies the user verification information against previously registered database of personal information, and verifies whether the user is a normal user. When proper authentication is obtained, by notifying the user information to the accounting server 7-3, the accounting process such as the price calculation or adjustment process to the cooperative process using the external cooperative system 1 can be performed not only through cash settlement by the accounting apparatus 70, but also through account settlement by the accounting server 7-3.

By this, it becomes possible to provide a cooperative service to the user, which can not be realized by only the image forming apparatus 5, for example, a service in which an image read by the image readout part 10 of the image forming apparatus 5 or an image downloaded from the Web server 3*f* is sent to the first ASP 7-1 and a character recognition process is performed, and then, the document data is sent to the second ASP 7-2 of performing the translation process, the document data after the process is sent to the image forming apparatus 5, and the accounting process to this cooperative process is performed by the accounting server 7-3 or the accounting apparatus 70.

<Basic Structural Example of Various Apparatuses>

Figure 2:
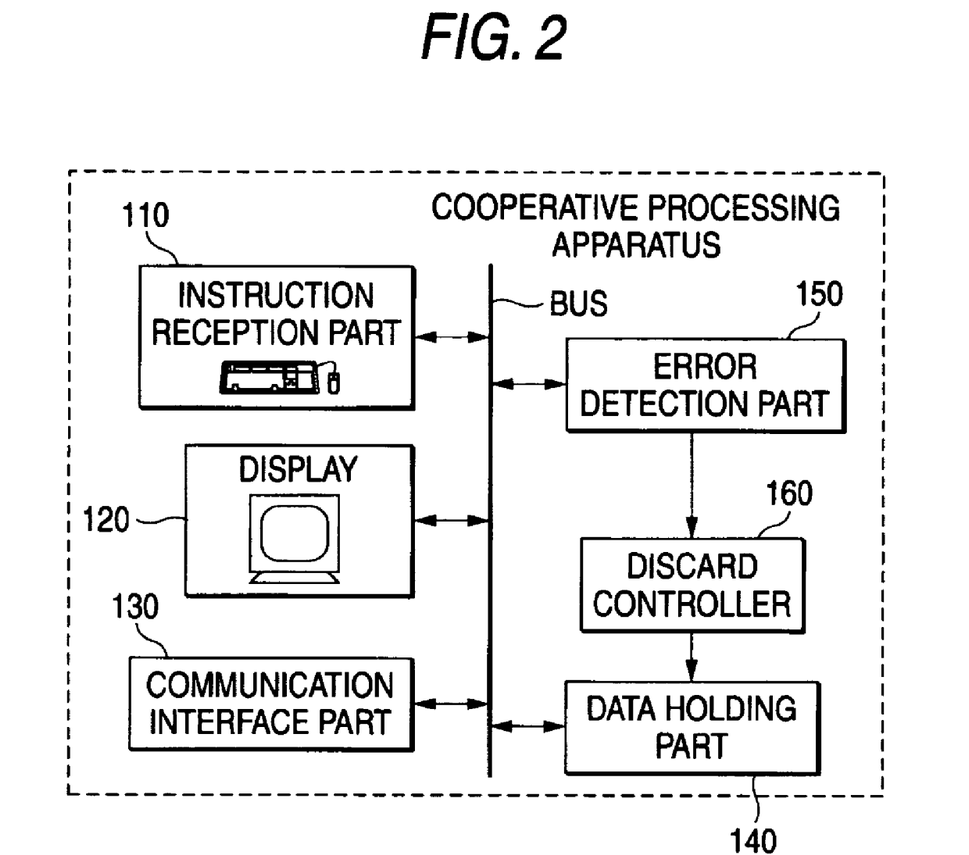
FIG. 2 is a functional block diagram of a cooperative processing apparatus of the invention.

FIG. 2 is a functional block diagram of the image forming apparatus 5 and the external apparatus 7 (collectively referred to as a cooperative processing apparatus) in which attention is paid to a functional portion for performing a data discard process at the time of error in the external cooperative process according to the invention.

The cooperative processing apparatus such as the image forming apparatus 5 or the external apparatus 7 includes an instruction reception part 110 to receive an operation instruction to the cooperative processing apparatus, a display 120 to display an operation menu, an operation state of the apparatus and various information, a communication interface part 130 to perform an interface function to a network, and a data holding part 140 which holds data relating to a cooperative process job and includes a hard disc apparatus or a semiconductor storage apparatus.

Besides, the cooperative processing apparatus includes, as a structure unique to the embodiment, an error detection part 150 to detect error occurrence of its own apparatus or another apparatus connected to the network, and a discard controller 160 to make a control so that when the error detection part 150 detects that an error occurs during the mutual cooperative process, data relating to the cooperative process job and remaining in the apparatus or the other cooperative apparatus is discarded from the data holding part 140.

The error detection part 150 may be any unit as long as it can detect that an error occurs in a part of the external cooperative system 1 during the mutual cooperative process, and for example, the error detection part detects the error having occurred in its own apparatus by itself, or detects the error having occurred in the other cooperative apparatus by using an error notification transmission/reception function, and various well-known methods can be adopted. Here, the explanation of its specific contrivance will be omitted.

Incidentally, when it is detected whether the error occurs in a part of the external cooperative system 1 during the mutual cooperative processing, it is possible to judge that the error has occurred also when there is no specific response from at least one apparatus among the plural apparatuses to perform the cooperative operation.

Besides, about judging that the error has occurred when there is no specific response from the other plural apparatuses to perform the cooperative operation, it is not necessary to always judge that the error has occurred when there is no specific response from any one apparatus. It is also possible to judge whether a judgment of error is made when there is no specific response, in view of the characteristic of the other apparatus. For example, it may be judged that the error occurs when there is no specific response from an apparatus, which becomes fatal to security when data remains, among the plural apparatuses to perform the cooperative operation. Thus, data may be discarded only if there is no specific response from an important apparatus, so it is possible to avoid such a situation that data is discarded in various cooperative apparatuses due to excessive reaction to the system error.

When the error occurs during the mutual cooperative process, the discard controller 160 controls the data holding part 140 provided in its own apparatus to delete the data in its own apparatus relating to the cooperative processing job.

Alternatively, the discard controller 160 issues an error notification to the error detection part 150 of the other cooperative apparatus, so that data relating to the cooperative processing job in the other cooperative apparatus can be deleted from the data holding part 140 provided in the other apparatus. The other cooperative apparatus having received the error notification causes the discard controller 160 to control the data holding part 140 provided in its own apparatus to delete the data which relate to the cooperative processing job and remain in its own apparatus. Incidentally, although the error notification to the other apparatus is performed through the discard controller 160 here, the structure can be made such that the error detection part 150 performs the error notification.

That is, in the external cooperative system 1 of the embodiment, when the error occurs in at least one of the plural apparatuses to perform the cooperative operation, the apparatus having detected the error deletes the data which relate to the cooperative processing job and remain in the apparatus, and the other apparatus having received the error notification deletes the data which relate to the cooperative operation job and remain in the other apparatus (the other apparatus to perform the cooperative operation) when the error notification is received.

Incidentally, it is not indispensable to always perform the data discard process when the error notification is received. It is also possible to judge whether the data discard process should be performed in view of the characteristic of the apparatus having issued the error notification. For example, the deletion may be made when the error is notified from the apparatus, which is fatal to the security when data remains, among the plural apparatuses to perform the cooperative operation. Thus, data may be discarded only at the time when the error occurs in an important apparatus, so it is possible to avoid such a situation that data is discarded in various cooperative apparatuses due to excessive reaction to the error.

As the data which relates to the cooperative processing job and becomes the delete object at the time of error, for example, there may be an intermediate generated file which is data in the image forming apparatus 5 during the process to the image read by the image readout part 10 of the image forming apparatus 5 or the image downloaded from the Web server 3f. Besides, there may be an intermediate generated file which is document data having been subjected to the character recognition process in the first ASP 7-1, document data having been subjected to the translation process in the second ASP 7-2, or data during a process in the first ASP 7-1 or the second ASP 7-2. Besides, there may be also accounting information used for the accounting process in the accounting server 7-3 or the accounting apparatus 70, or an intermediate generated file which is data during the accounting process. Besides, user information used in the external cooperative processes is also an example of the data which relate to the cooperative processing job and becomes the delete object.

<Structural Example of Cooperative Processing Apparatus Using Electronic Calculators>

Incidentally, in the embodiment, the contrivance to perform the data discard process at the time when the error occurs during the execution of the external cooperative process is not limited to the structure of the hardware processing circuits, and it can also be realized in software using an electronic calculator (computer) based on a program code to realize the function.

Thus, as the invention, it is possible to extract a program to realize the external cooperative processing method (especially the data discard processing at the time of error) of the invention, the image forming apparatus or the external apparatus 7 (especially, the function portion relating to the data discard process at the time of error) by using the electronic calculator (computer) and by software, or a computer readable storage medium storing the program.

In the case where an electronic calculator is made to execute a series of external cooperative process (especially the data discard process at the time of error) functions by software, the program constituting the software is installed from the storage medium into a computer (built-in microcomputer etc.) incorporated in dedicated hardware, an SOC (System On a Chip) to realize a desired system in which functions of a CPU (Central Processing Unit), a logical circuit, a storage device and the like are mounted on one chip, or a general-purpose personal computer which can execute various functions by installing various programs.

The storage medium causes a state change of energy, such as magnetism, light or electricity, in the readout apparatus provided in the hardware resource of the computer according to the description content of the program, and can transmit the description content of the program to the readout apparatus in the format of signals corresponding thereto.

The storage medium includes, for example, a package medium (portable storage medium), which is distributed to the user to provide the program differently from the computer, such as a magnetic disc (including a flexible disc FD) on which the program is recorded, an optical disc (including a CD-ROM (Compact Disc-Read Only Memory), a DVD (Digital Versatile Disc), and a magneto-optical disc (including MD (Mini Disc)) or a semiconductor memory, and further, it may include a ROM or a hard disc on which the program is recorded and which is provided to the user in a state where it is previously incorporated in the computer.

Besides, in addition to the provision of the program constituting the software through the recording medium, the program may be provided through a wired or wireless communication network without using the recording medium.

For example, the storage medium storing the program code of the software to realize the external cooperative process function is supplied to a system or an apparatus, and also in the case where the computer (or CPU or MPU) of the system or the apparatus reads and executes the program code stored in the storage medium, the effect similar to the case where the hardware processing circuit is adopted is achieved. In this case, the program code itself read out from the storage medium realizes the external cooperative process function.

Besides, in addition to the case where the computer executes the read program code so that the function to perform the external cooperative process is realized, an OS (Operating System; basic software) running on the computer performs a part of or all of the actual process based on the instruction of the program code, and the function to perform the external cooperative process may be realized by the process.

Further, the case may be made such that after the program code read out of the storage medium is written in a function expansion card inserted in the computer or a memory provided in a function expansion unit connected to the computer, the function expansion card or the CPU provided in the function expansion unit performs a part of or all of the actual process based on the instruction of the program code, and the function to perform the external cooperative process is realized by the process.

Incidentally, although the program is provided as the file describing the program code which realizes the function to perform the external cooperative process, in this case, in addition to the case where the collective program file is provided, the program may be provided as individual program modules in accordance with the hardware structure of the system constructed by the computer.

Figure 3:
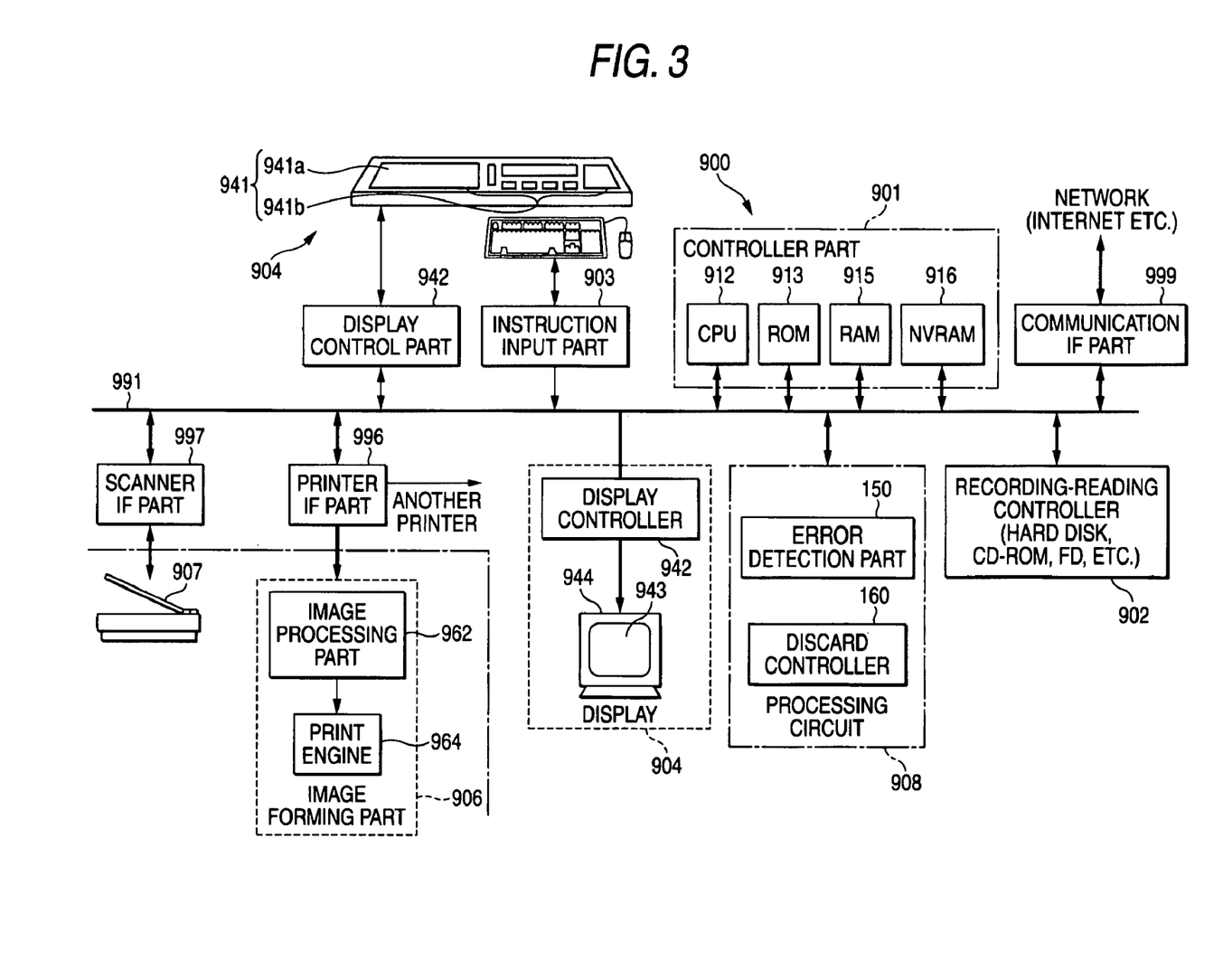
FIG. 3 is a view showing an example of a hardware structure in a case where a cooperative processing apparatus is constructed by using an electronic calculator.

For example, FIG. 3 is a block diagram showing an example of a hardware structure in a case where an external cooperative apparatus, such as the image forming apparatus 5 or the external apparatus 7, having a function to perform the external cooperative process in software by using a CPU or a memory is constructed, that is, the external cooperative process is realized in software by using the function of a computer (electronic calculator) such as a personal computer.

Of course, in addition to the structure using the computer as stated above, the structure to perform the external cooperative process can also be realized by combination of dedicated hardware to perform the processes of the respective function parts of the image forming apparatus 5 and the external apparatus 7 shown in FIG. 2. However, by adopting the contrivance to execute the process by software, the merit that the process procedure can be easily changed without changing the hardware can be obtained.

For example, a computer system 900 includes a controller part 901, and a recording/readout controller 902 (corresponding to the data holding part 140) to read data from a specified storage medium, such as a hard disc apparatus, a flexible disc (FD) drive, a CD-ROM (Compact Disc ROM) drive, or a semiconductor memory controller, and to record it.

The controller part 901 includes a CPU (Central Processing Unit) 912, a ROM (Read Only Memory) 913 as a memory for reading only, a RAM (Random Access Memory) 915 which can randomly access and read out and is an example of a volatile memory, and a RAM (denoted by NVRAM) 916 as an example of a nonvolatile memory. The NVRAM 916 can store, for example, temporal data. In this case, the NVRAM 916 functions as a temporal data holding part.

In the above, the "volatile memory" means a memory of a mode in which in a case where the main power source of the cooperative processing apparatus is turned off, the memory content is erased. On the other hand, the "nonvolatile memory" means a memory of a mode in which even in the case where the main power source of the cooperative processing apparatus is turned off, the memory content is retained. Any memory is adopted as long as the storage content can be retained, and in addition to one in which a semiconductor memory element itself has the nonvolatility, a structure may be made such that a backup power source is provided, and the volatile memory element has the "nonvolatility". Besides, in addition to a structure including the semiconductor memory element, a structure may be made such that a medium such as a magnetic disc or an optical disc is used. For example, a hard disc apparatus can be used as a nonvolatile memory.

Besides, the computer system 900 includes, as a function part which is a user interface, an instruction input part 903 (corresponding to the instruction reception part 110) using a keyboard, a mouse, or an operation panel part 941 provided in the cooperative processing apparatus and including a display panel part 941*a* and an operation key part 941*b*, a display output part 904 (corresponding to the display 120) to present a guidance screen at the time of an operation and specified information such as processing results to the user, and an interface part (IF part) 909 having an interface function to the respective function parts.

The display output part 904 includes a display controller 942 and a display apparatus. As the display apparatus, for example, the operation panel part 941 provided in the cooperative processing apparatus can be used. Alternatively, another display 944 including a CRT or an LCD can also be used. Incidentally, when the display 944 is constructed to include a touch panel 943 on its surface, the instruction input part 903 in which specified information is inputted by a finger tip or a pen can also be constructed.

Incidentally, in the case where the image forming apparatus 5 is constructed, a function portion to perform a specified data process on the data to be provided in the external cooperative process is also provided in the computer system 900. For example, the structure is made such that there are provided an image forming part 906 to output an image, in which an address of a link destination is coded and is buried in a print image, to a specified output medium (for example, printing paper) and corresponding to the image output part 30, and an image readout part (scanner unit) 907 to read the image as a print object and corresponding to the image readout part 10.

The image forming part 906 uses an electrophotographic, thermal, thermal transfer, ink-jet or similar conventional image forming process to form (print) a visible image on a normal paper or thermal paper based on, for example, an image expressed by an image signal obtained by the image readout part 907 or received image data. Thus, the image forming part 906 includes an image processing part 962 to generate print output data such as, for example, digitized signals of yellow Y, magenta M, cyan C and black K, and a print engine 964 of, for example, a raster output scan (ROS) base or an ink-jet system.

The image readout part 907 includes a function of an image input terminal, and uses, for example, a full array of CCD solid image pickup elements, irradiates light to a document sent to a readout position to read the image on the document, and converts analog video signals of red R, green G, and blue B to express the read image into digital signals.

An interface part 909 includes, in addition to a system bus 991 as a transfer path of processing data (including image data) and control data, for example, a scanner IF part 997 to function as an interface to the image readout part 907, a printer IF part 996 to function as an interface to the image forming part 906 and the other printer, and a communication IF part 999 (corresponding to the communication interface part 130) to mediate communication data to the network such as the Internet.

Incidentally, instead of performing all processes of the respective function portions for the external cooperative process by software, a processing circuit 908 to perform a part of the function portions by dedicated hardware and including an error detection part 150 and a discard controller 160 may be provided. Although the contrivance to perform the processes by software can flexibly handle a parallel process and a continuous process, as the process becomes complicated, a process time becomes long, and therefore, there is a problem of a decrease in process speed. On the other hand, by performing the processes by the hardware processing circuit, a speed-up accelerator system can be configured. Even if the process is complicated, the accelerator system can prevent the process speed from lowering, and a high throughput can be obtained.

In the structure as stated above, the CPU 912 controls the whole system through the system bus 991 and corresponds to the so-called controller. The ROM 913 stores a control program of the CPU 912 and the like. The RAM 915 is constructed of an SRAM (Static Random Access Memory) or the like, and stores program control variables and data for various processes. Besides, the RAM 915 includes a region to temporarily store an electric document (image data may be included in addition to character data) acquired by a specified application program, image data acquired by the image readout part 907 provided in its own apparatus, an electric document acquired from the outside and the like.

For example, the program to cause the computer to execute the external cooperative process function is distributed through a recording medium such as a CD-ROM. Alternatively, this program may be stored in an FD, not the CD-ROM. Besides, an MO drive is provided, and the program may be stored in an MO, or the program may be stored in another recording medium, for example, a nonvolatile semiconductor memory card such as a flash memory. Further, the program may be downloaded from another server through the network such as the Internet, or may be updated.

Incidentally, as the recording medium to provide the program, in addition to the FD and the CD-ROM, an optical recording medium such as a DVD, a magnetic recording medium such as an MD, a magneto-optical recording medium such as a PD, a tape medium, a magnetic recording medium, a semiconductor memory such as an IC card or a miniature card can be used. A partial or all function to realize the external cooperative process function can be stored in the FD or CD-ROM as an example of the recording medium.

Besides, the hard disc apparatus includes a region to store data for various processes by the control program and to temporarily store a large amount of image data acquired by the image readout part 907 or image data received from the outside. Besides, the hard disc apparatus, the FD drive or the CD-ROM drive is used to register program data for causing the CPU 912 to execute processes such as content acquisition, address acquisition, and address setting by software.

<Case Example of Process>

Figure 4:
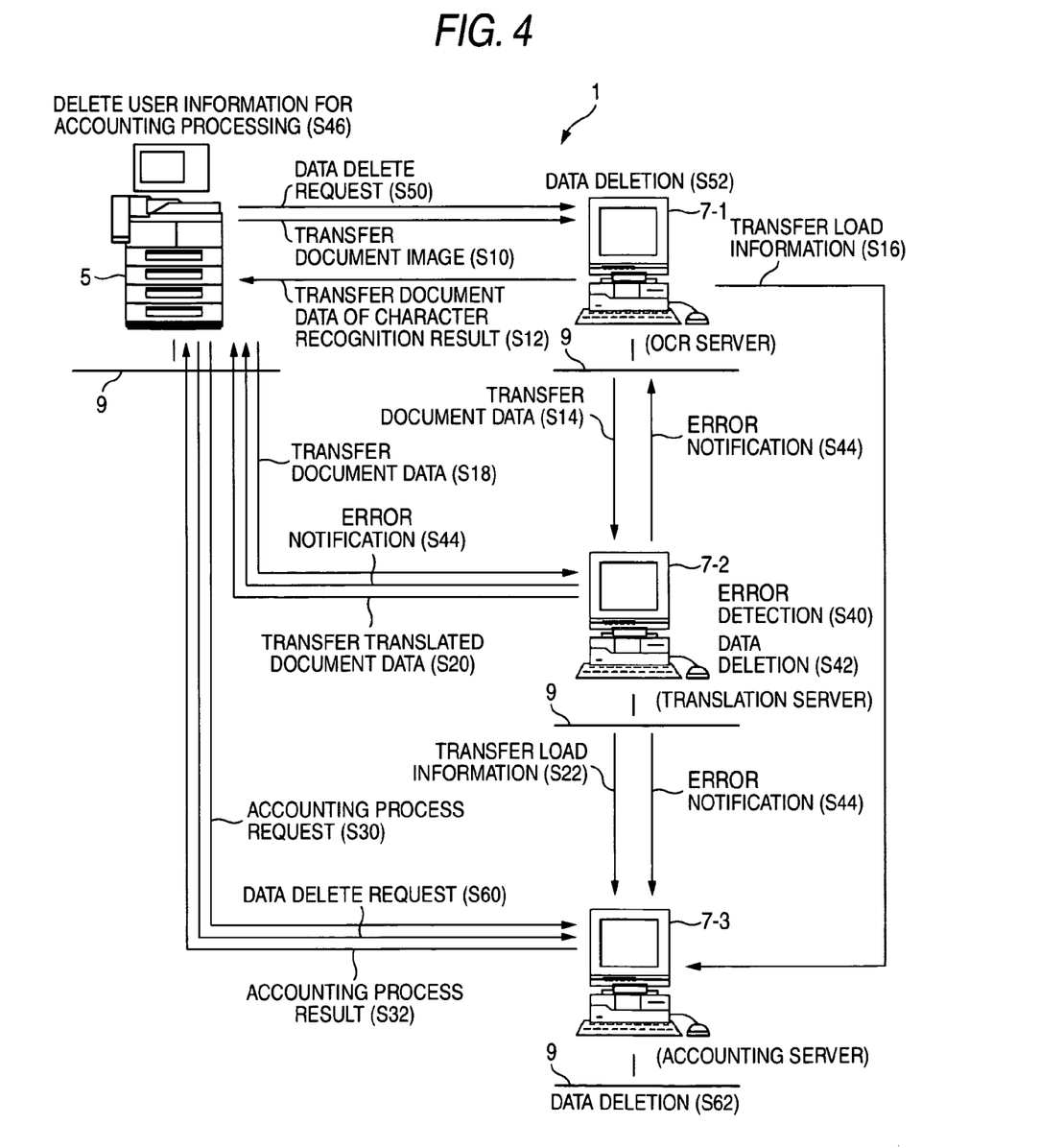
FIG. 4 is a view for explaining one of specific examples of an external cooperative process in an external cooperative system and a data discard process at the time of error occurrence.

FIG. 4 is a view for explaining an example of an external cooperative process in the external cooperative system 1 of the above structure and a data discard process at the time of error occurrence. The image forming apparatus 5, the first ASP 7-1, the second ASP 7-2, and the accounting server 7-3 can notify an error to each other. When the error detection part 150 detects that an error occurs in its own apparatus, the error detection part 150 or the discard controller 160 notifies the error detection part 150 of another apparatus through the network 9 that the error occurs.

In the image forming apparatus 5 having the browse function to download the homepage data from the Web server 3ƒ to display it on the display screen of the operation panel part 15a or the user interface apparatus 16 or to print the information of the homepage onto the paper, the document image read by the image readout part 10 and the image downloaded from the Web server 3ƒ are transferred to the first ASP 7-1 of performing a character recognition service (S10).

The first ASP 7-1 recognizes the character portion existing in the image transferred from the image forming apparatus 5 to create document data made of text information, and transfers the document data to the image forming apparatus 5 (S12), and also transfers it to the second ASP 7-2 of performing the translation service (S14). Besides, the first ASP 7-1 sends load information (for example, process time, etc.) required for the character recognition process to the accounting server 7-3 (S16).

Besides, the image forming apparatus 5 downloads the homepage data (an example of document data) from the Web server 3ƒ and transfers it to the second ASP 7-2 of performing the translation service (S18).

The second ASP 7-2 of performing the translation service converts (that is, translates) the document data transferred from the first ASP 7-1 or the homepage data transferred from the image forming apparatus 5 into document data of a different language system, and transfers the translated document data to the image forming apparatus 5 (S20). Besides, the second ASP 7-2 sends the load information (for example, the process time etc.) required for this translation process to the accounting server 7-3 (S22).

When receiving the accounting process request to the cooperative process in the external cooperative system 1 from the image forming apparatus 5 (S30), the accounting server 7-3 performs the accounting process to the cooperative process in the external cooperative system 1 based on the load information required for the character recognition process and the translation process transferred from the first ASP 7-1 and the second ASP 7-2, and notifies an intermediate generated file of the accounting process stage and information of the accounting process result to the image forming apparatus 5 (S32).

Here, for example, in the case where after the document image read by the image readout part 10 of the image forming apparatus 5 is character-recognized by the first ASP 7-1 and is transferred to the second ASP 7-2, an error occurs in the second ASP 7-2 of performing the translation service (S40), the second ASP 7-2 deletes an intermediate generated file relating to the translation process and held in the data holding part 140 of its own apparatus (S42), and sends an error notification to the image forming apparatus 5, the first ASP 7-1, and the accounting server 7-3 (S44).

When the image forming apparatus 5 receives the error notification, the discard controller 160 automatically deletes the user information for accounting of the translation service and remaining in the data holding part 140 of the image forming apparatus 5 (S46).

Besides, the discard controller 160 of the image forming apparatus 5 requests the discard controller 160 of the first ASP 7-1 to delete the intermediate generated file relating to the character recognition process and remaining in the data holding part 140 in the first ASP 7-1 which is a cooperative ASP (example of a residual apparatus) other than the second ASP 7-2 in which the error has occurred, that is, makes a delete request (S50). The discard controller 160 of the first ASP 7-1 having received this request deletes the intermediate generated file relating to the character recognition process and remaining in the data holding part 140 of the first ASP 7-1 (S52).

Besides, the discard controller 160 of the image forming apparatus 5 requests the discard controller 160 of the accounting server 7-3 to delete accounting information (for example, user information) for accounting for the character recognition process and translation process and the intermediate generated file remaining in the data holding part 140 of the accounting server 7-3 as the cooperative ASP (example of the residual apparatus) other than the second ASP 7-2 in which the error has occurred, that is, a delete request is made (S60). The discard controller 160 of the accounting server 7-3 having received this request deletes the accounting information (for example, user information) and the intermediate generated file remaining in the data holding part 140 of the accounting server 7-3 (S62).

Incidentally, in this example, although the discard process of the data relating to the cooperative process job and remaining in the first ASP 7-1 and the accounting server 7-3 as the external equipment cooperating with the image forming apparatus 5 at the time when the error has occurred in the second ASP 7-2 during the mutual cooperative process is performed after receipt of the discard request from the image forming apparatus 5, it may be performed after receipt of the error notification from the second ASP 7-2.

As described above, some embodiments of the invention are outlines below.

According to an aspect of the invention, a cooperative processing method for a cooperative processing system including a plurality of processing apparatuses includes: detecting an error of a process of a cooperative process in an apparatus of the cooperative processing system, and deleting data which relate to the cooperative process from the apparatus or other apparatus which relates to the cooperative process.

According to another aspect of the invention, a cooperative processing apparatus of a cooperative processing system which has a plurality of apparatuses which perform a cooperative processing includes:

an error detection part that detects an error of a process of a cooperative process in an apparatus; and a discard controller that controls to discard data which relate to the cooperative process from the apparatus or other apparatus which relates to the cooperative process.

The discard controller may control to discard the data which relate to the cooperative process from the apparatus when receiving an error notification from the other cooperative processing apparatus.

And, when receiving an error notification from the other cooperative processing apparatus, the discard controller may request another cooperative processing apparatus of the cooperative system to discard data which relate to the cooperative process.

The error detection part may judge that an error occurs when there is no specific response from other apparatus to perform a cooperative operation.

The error detection part also may judge that an error occurs when there is no specific response from a predetermined apparatus to perform a cooperative operation.

When the error detection part detects the error, the discard controller may send an error notification to the other apparatus of the cooperative processing system.

According to yet another aspect of the invention, a storage medium readable by a computer, storing a program of instructions executable by the computer to perform a function for realizing a cooperative process among a plurality of apparatuses, includes:

detecting an error of a process of a cooperative process in an apparatus, and controlling to discard data relating to the cooperative process from the apparatus or other apparatus which relates to the cooperative process.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claims is:

1. A cooperative processing method for a cooperative processing system including a plurality of processing apparatuses, comprising:

performing preprocessing tasks on output data, using the plurality of apparatuses, prior to the cooperative processing system's processing of data;

detecting an error of a process of a cooperative process in an apparatus of the cooperative processing system;

sending a notification to at least one of the plurality of apparatuses to notify at least one of the plurality of apparatuses to delete data relating to the cooperative processing upon detecting an error of a process of a cooperative process in an apparatus;

receiving the notification to delete data relating to the cooperative processing;

controlling to discard data by judging whether or not the particular data should be deleted based upon the type of error detected; and deleting data which relate to the cooperative process from the apparatus and other apparatus which relates to the cooperative process.

2. A cooperative processing apparatus of a cooperative processing system including a plurality of apparatuses which perform a cooperative processing, comprising:

an output device using the plurality of apparatuses to perform preprocessing on output data;

a cooperative process part that allows the plurality of apparatuses to perform preprocessing tasks prior to the cooperative processing apparatus processing data to the output device;

an error detection part that detects an error of a process of a cooperative process in an apparatus; and a discard controller that controls to discard data which relate to the cooperative process from the apparatus and other apparatus which relates to the cooperative process, wherein the error detection part sends a notification to at least one of the plurality of apparatuses to notify at least one of the plurality of apparatuses to delete data relating to the cooperative processing, and the discard controller receives the notification from the error detection part and controls to discard data by judging whether or not the particular data should be deleted based upon the type of error detected by the error detection part.

3. The cooperative processing apparatus according to claim 2, wherein the discard controller controls to discard the data which relate to the cooperative process from the apparatus when receiving an error notification from the other cooperative processing apparatus.

4. The cooperative processing apparatus according to claim 3, wherein when receiving an error notification from the other cooperative processing apparatus, the discard controller requests another cooperative processing apparatus of the cooperative system to discard data which relate to the cooperative process.

5. The cooperative processing apparatus according to claim 2, wherein the error detection part judges that an error occurs when there is no specific response from other apparatus to perform a cooperative operation.

6. The cooperative processing apparatus according to claim 5, wherein the error detection part judges that an error occurs when there is no specific response from a predetermined apparatus to perform a cooperative operation.

7. A storage medium readable by a computer, the storage medium storing a program of instructions executable by the computer to perform a function for realizing a cooperative process among a plurality of apparatuses, the function comprising: performing preprocessing tasks on output data, using the plurality of apparatuses, prior to the cooperative processing system's processing of data;

detecting an error of a process of a cooperative process in an apparatus;

sending a notification to at least one of the plurality of apparatuses to notify at least one of the plurality of apparatuses to delete data relating to the cooperative processing upon detecting an error of a process of a cooperative process in an apparatus;

receiving the notification to delete data relating to the cooperative processing; and controlling to discard data by judging whether or not the particular data should be deleted based upon the type of error detected and then deleting data relating to the cooperative process from the apparatus and other apparatus which relates to the cooperative process.

8. The cooperative processing apparatus according to claim 2, wherein when the error detection part detects the error, the discard controller sends an error notification to the other apparatus of the cooperative processing system.

9. The storage medium according to claim 7, the function further comprising:

when the error is detected, sending an error notification to the other apparatus of the cooperative processing system.

* * * * *